United States Patent
Christensen et al.

(10) Patent No.: US 10,312,515 B2
(45) Date of Patent: Jun. 4, 2019

(54) LITHIUM SULFUR CELL WITH DOPANT

(71) Applicant: Robert Bosch GmbH, Stuttgart (DE)

(72) Inventors: John F. Christensen, Elk Grove, CA (US); Boris Kozinsky, Waban, MA (US); Aleksandar Kojic, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 111 days.

(21) Appl. No.: 15/451,356

(22) Filed: Mar. 6, 2017

(65) Prior Publication Data

US 2017/0256798 A1    Sep. 7, 2017

Related U.S. Application Data

(60) Provisional application No. 62/304,473, filed on Mar. 7, 2016.

(51) Int. Cl.
| | |
|---|---|
| *H01M 4/58* | (2010.01) |
| *H01M 4/36* | (2006.01) |
| *H01M 10/052* | (2010.01) |
| *H01M 4/38* | (2006.01) |
| *H01M 4/02* | (2006.01) |

(52) U.S. Cl.
CPC ......... *H01M 4/5815* (2013.01); *H01M 4/366* (2013.01); *H01M 4/38* (2013.01); *H01M 4/382* (2013.01); *H01M 4/388* (2013.01); *H01M 4/58* (2013.01); *H01M 4/581* (2013.01); *H01M 4/582* (2013.01); *H01M 10/052* (2013.01); *H01M 2004/028* (2013.01); *H01M 2220/20* (2013.01)

(58) Field of Classification Search
CPC ...... H01M 4/5815; H01M 4/366; H01M 4/38; H01M 4/382; H01M 4/58; H01M 4/581; H01M 4/582; H01M 10/042; H01M 10/054; H01M 2004/028
USPC ................. 429/212, 231.5, 231.95
See application file for complete search history.

(56) References Cited

U.S. PATENT DOCUMENTS

| | | | |
|---|---|---|---|
| 7,951,747 B1* | 5/2011 | Thoma ................. B01J 27/051 502/152 |
| 9,153,818 B2* | 10/2015 | Caldwell ............... H01M 4/366 |
| 9,955,241 B2* | 4/2018 | Smith ..................... G06F 21/43 |
| 2012/0094189 A1* | 4/2012 | Scrosati ............. H01M 4/0485 429/314 |
| 2012/0286219 A1 | 11/2012 | Ikisawa et al. |
| 2013/0059209 A1* | 3/2013 | Ota ........................ H01M 4/131 429/304 |
| 2013/0149567 A1 | 6/2013 | Schaefer |
| 2013/0337293 A1* | 12/2013 | Eisele ..................... H01M 4/38 429/50 |
| 2014/0315087 A1 | 10/2014 | Yu et al. |
| 2014/0356705 A1* | 12/2014 | Shaw ..................... C01B 17/22 429/212 |
| 2015/0064575 A1 | 3/2015 | He et al. |
| 2016/0240840 A1* | 8/2016 | He ......................... H01M 4/366 |
| 2018/0123136 A1* | 5/2018 | Gumeci ................. H01M 4/668 |

FOREIGN PATENT DOCUMENTS

| | | |
|---|---|---|
| DE | 102014213271 | 1/2016 |
| WO | 2014144046 | 9/2014 |

OTHER PUBLICATIONS

Machine translation of DE 10 2014 213271 (no date).*
International Search Report and Written Opinion for Application No. PCT/US2017/021013 dated May 4, 2017 (15 pages).
Abouimrane et al., "A New Class of Lithium and Sodium Rechargeable Batteries Based on Selenium and Selenium-Sulfur as a Positive Electrode," J. Am. Chem. Soc. 2012, 134, 4505-4508.
Li et al., "Amorphous S-rich $S1_xSe_x/C$ (x < 0.1) composites promise better lithium-sulfur batteries in a carbonate-based electrolyte," Energy Environ. Sci., 2015, 8, 3181-3186.
International Preliminary Report on Patentability for Application No. PCT/US2017/021013 dated Sep. 20, 2018 (9 pages).

* cited by examiner

*Primary Examiner* — Amanda C. Walke
(74) *Attorney, Agent, or Firm* — Michael Best & Friedrich LLP

(57) ABSTRACT

Among other things, the present disclosure provides a particle comprising a form of sulfur and/or lithium sulfide ($Li_2S$) that is doped with a group VIA element, such as selenium (e.g. Se34), tellurium (e.g. Te52), or polonium (e.g. Po84). The present disclosure also provides a cell comprising a negative electrode, a separator, and a positive electrode comprising the particles of the present disclosure.

10 Claims, No Drawings

LITHIUM SULFUR CELL WITH DOPANT

CROSS-REFERENCE TO RELATED APPLICATIONS

This application claims the benefit of U.S. Provisional Application No. 62/304,473, filed Mar. 7, 2016, which is incorporated herein by reference.

BACKGROUND

Rechargeable lithium-ion batteries are attractive energy storage systems for portable electronics and electric and hybrid-electric vehicles because of their high specific energy compared to other electrochemical energy storage devices. A typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

In particular, batteries with a lithium metal negative electrode afford exceptionally high specific energy (in Wh/kg) and energy density (in Wh/L) compared to batteries with conventional carbonaceous negative electrodes. Other metals, such as Zn, Mg, Na, Fe, Al, Ca, Si, and others, also have a favorable specific energy and energy density.

To enable electric vehicles with a range approaching that of present-day vehicles (>300 miles) a battery chemistry with a significantly higher specific energy is required than the present state of the art lithium-ion batteries. The Department of Energy has set a long-term goal for the maximum weight of an electric vehicle battery pack to be 200 kg (this includes the packaging). The use of other metals can also offer a higher specific energy than Li-ion cells with conventional positive electrodes. Through the use of a lithium metal negative electrode and a positive electrode reacting oxygen, a driving range above 300 miles is possible. A driving range above 300 miles may also be possible with other metals.

The lithium-sulfur (Li/S) battery chemistry is attractive due to its high theoretical gravimetric energy density (2600 Wh/kg) and low cost of the active cathode material, sulfur. Typical Li/S cells involve solid charge and discharge products ($S_8$ and $Li_2S$ [or $Li_2S_2$], respectively) that undergo conversion to soluble polysulfides ($Li_2S_n$, $2<n<=8$) at intermediate degrees of lithiation during the charge and discharge processes.

There are significant challenges that must be addressed for the lithium-sulfur system to become commercially viable. Important challenges include increasing the cycle life (current state of the art is 100 to several hundred cycles; target is >500, preferably >2000), increasing the utilization of sulfur (typical utilization is below 75% due to passivation of the positive electrode by $Li_2S$ or $Li_2S_2$, which are electronically insulating), increasing the mass fraction of sulfur in the positive electrode (typically the mass fraction is below 50%), and increasing the rate capability of the cell (target discharge rate is 1 C or higher). While some Li/S cells described in the literature fulfill some of the objectives for cycle life, specific energy, and specific power, none of these cells have been industrialized for mass-market applications due to deficiencies in one or more areas.

A particular concern is the fact that in many Li/S cells, the soluble polysulfides are free to migrate throughout the liquid electrolyte, and they may accumulate in parts of the cell where they are not particularly accessible for the reactions necessary to charge and discharge the cell. This can lead to capacity fade and loss of power capability over time. IN the worst case, these polysulfides can migrate to the negative electrode, where they are reduced upon reaction with the lithium metal anode. These reduced polysulfides can react with less reduced polsulfides in solution, leading to a self discharge of the cell until eventually solid sulfides may be formed at the anode surface. Usually these highly reduced products are not recoverable; hence the "polysulfide shuttle," as it is known in the literature, ultimately results in capacity fade and potentially cell failure.

To avoid this shuttle effect, several researchers have explored the use of immobilizing electrolytes (either solid electrolytes or liquid electrolytes with very low polysulfide solubility) to prevent migration of the active cathode material. Others have attempted to confine sulfur within nanoporous structures, while still others have attempted to coat the materials with a Li-transparent material. A challenge associated with these approaches is that $Li_2S$ is electronically insulating and therefore must be restricted to small domain size (<100 nm) in order for the cell to be charged and discharged at practically relevant rates. One approach to increasing the conductivity of the $Li_2S$, and therefore the battery's rate capability, is to dope the $Li_2S$ with another element.

Previously, doping $Li_2S$ or S with other elements in Li/S cells required in-situ doping during battery operation because the charging and discharging of the battery involved a phase transition from S to $Li_2S_2$ and $Li_2S$ via a polysulfide ($Li_2S_x$, $3<=x<=8$) intermediate that dissolves in the electrolyte. Hence, there was no straightforward method for introducing other dopants from solution during precipitation of the S or $Li_2S$ (or $Li_2S_2$).

SUMMARY

Among other things the present disclosure provides a particle comprising $Li_2S_{1-x-y}Se_xM_y$, wherein M is a Group VIA element; $x<0.1$; and $y<0.05$.

The present disclosure also provides a lithium-sulfur cell comprising: a negative electrode; a separator; and a positive electrode comprising the particle as disclosed herein.

DETAILED DESCRIPTION

Before any examples of the disclosure are explained in detail, it is to be understood that the disclosure is not limited in its application to the details of construction and the arrangement of components set forth in the following description or illustrated in the following drawings. The disclosure is capable of other examples and of being practiced or of being carried out in various ways.

In one aspect, the present disclosure provides a lithium-sulfur cell with improved cycle life and energy density. The cathodes according to the present disclosure may provide an increased cycle life for Li/S cells; improved electrical conductivity of $Li_2S$ by introducing dopants; the ability to use of larger particles, which can result in the use of less "dead mass," thereby increasing the cell-level volumetric and gravimetric energy density. The improved conductivity may yield effectively higher diffusion coefficients for the material, thereby enabling higher volumetric and gravimetric power density. In one aspect, the present disclosure allows one to increase the sulfur loading and utilization of the cell; to decrease the charging time; and/or to increase the power delivered from the battery.

In an aspect, the cell comprises a negative electrode, a separator, and a positive electrode. In an example, the positive electrode is connected to an electronically-conductive current collector (e.g., Al metal). In an example, the negative electrode may further comprise have a current collector, such as copper metal. Alternatively, Li metal may be used to conduct electrons to and from the electrode. In some examples, the lithium-sulfur cells of the present disclosure have improved properties, such as conductivity, cycle life, and/or energy density.

In an example, the cell described above may be double sided (i.e., symmetric about the Al current collector as follows: negative electrode/separator/positive electrode/positive current collector/positive electrode/separator/negative electrode/(negative current collector) and stacked (as a "stack") or wound (as a "jellyroll") so as to increase the capacity per unit volume, or it may be stacked in a bipolar design (negative electrode/separator/positive electrode/positive current collector/bipolar plate/negative electrode) so as to increase the cell voltage. This electrochemically active volume may be enclosed in a cell housing, the terminals of which are wired to the negative and positive poles of the stack or jellyroll.

The negative electrode suitably comprises a Li-insertion material, such as Li metal, that can reversibly insert and extract Li ions electrochemically. In examples, the negative electrode is a copper current collector with a protective solid electrolyte coating (e.g. an ionically conductive ceramic, such as lithium phosphorous oxynitride (LiPON); lithium lanthanum zirconate (LLZO); $Li_3N$; $Li_3P$, lithium lanthanum titanate (LLTO); a sulfidic lithium conductor such as $Li_3PS_{4+n}$ (n=0 to 9), $Li_{10}GeP_2S_{12}$, $Li_4P_2S_7$, $Li_2S$—$P_2S_5$—LiI [e.g., $Li_3PS_4$—LiI, especially $Li_7P_2S_8I$], $Li_{3+x}Ge_xAs_{1-x}S_4$ where x=0 to 0.50; BN; $Li_2CO_3$, etc., and variants thereof). In examples, there may be some Li metal between the current collector and the protective coating, or the Li may be deposited there in situ during the initial charging of the battery cell. In examples, the negative electrode may be a bare copper (or other, e.g., Ni) current collector, or it may be a Li foil.

The separator is electronically insulating. In an example, the separator comprises a Li-conducting solid electrolyte and/or a porous material with Li-conducting liquid electrolyte in the pores. The separator may include lithium phosphorous oxynitride (LiPON), Li-conducting garnet, Li-conducting sulfide (e.g., $Li_2S$—$P_2S_5$), Li-conducting polymer (e.g., polyethylene oxide), Li-conducting metal organic frameworks, thioLiSiCONs, Li-conducting NaSICONs, $Li_{10}GeP_2S_{12}$, lithium polysulfidophosphates, lithium aluminum titanium silicon phosphate (LATSP); or other solid Li-conducting material. In examples, the separator may be a porous polyolefin layer. At least some of the pores may be filed with the electrolyte used in the positive electrode. In some examples, such as where the protective layer is a solid electrolyte, no additional separator is necessary.

In an example, the positive electrode comprises a form of sulfur and/or lithium sulfide ($Li_2S$) that is doped with a group VIA element, such as selenium (e.g. Se34), tellurium (e.g. Te52), or polonium (e.g. Po84). In some examples, the positive electrode further comprises one or more of (1) additional Li-insertion materials, (2) an electronically conducting material (e.g., carbon fragments, graphite, and/or carbon black), and (3) a Li-conducting phase (e.g., liquid electrolyte and/or solid electrolyte), and optionally polymeric binder (e.g., PVDF). In an example, the doped $Li_2S$ particle is coated, suitably with a mixed conducting material such as carbon or $TiS_2$ that is minimally or not electrochemically active in the voltage window over which the cathode material is cycled (e.g., 1.5 to 2.5 V vs. Li). Because $Li_2S$ and $Li_2S_2$ are electronically insulating, the practical cyclable domain size is very small (several to tens of nm). However, doping these materials with elements such as Se can dramatically increase the electronic conductivity, thereby increasing both the rate capability and the utilization of the sulfide material.

Suitably, the doped $Li_2S$ particle has the formula $Li_2S_{1-x-y}Se_xM_y$ particle, wherein M is a second Group VIA metal, such as Te or Po, and wherein x<0.1; y<0.05. The $Li_2S_{1-x-y}Se_xM_y$ may be made from commercially available $Li_2S$ that is milled together with small amounts of a group VIA element. In examples, the $Li_2S$ is milled into small grains about 100 nm to about 10 μm in diameter. In examples, the $Li_2S$ may be obtained from synthesized nano-$Li_2S$ (less than about 1 μm in diameter). In an example, the Group VIA element may be a lithiated Group VIA element. Suitably, the Group VIA element is about 100 nm to about 10 μm in diameter. Alternatively, the Group VIA element may be a nanoparticle. The $Li_2S_{1-x-y}Se_xM_y$ particles may be any shape, but are suitably spherical.

In an example, the Group VIA element is present in an amount of from about 0 to about 7 atomic weight %. In an example, a second Group VIA element may be present in an amount of up to about 1 atomic weight %. Suitably, the Group VIA element is selenium. Suitably, the second Group VIA element is not selenium.

In an example, the $Li_2S_{1-x-y}Se_xM_y$ is coated with a material that prevents it from reacting with the electrolyte or, in the case of a liquid electrolyte, dissolving into the electrolyte, even after Li is extracted electrochemically from the $Li_2S_{1-x-y}Se_xM_y$. Suitably, the coating material is preferably a mixed electronic and $Li^+$ conductor, such as carbon or $Ti_2S$, but it may also be an insulator such as $Al_2O_3$. The coating should be very thin such that it comprises no more than about 20% of the mass of the coated $Li_2S$.

In various examples, the coating may be deposited via a chemical vapor deposition (CVD), atomic layer deposition (ALD), physical vapor deposition (PVD) or other coating process. When carbon is the coating, it can be deposited on the surface of the $Li_2S$ particles by CVD using gaseous $C_2H_2$ as a precursor. The CVD may be carried out at approximately 400° C. under slowly-flowing argon. The coating procedure may be carried out several times in order to ensure complete coverage of the particles.

Nano-$Li_2S$ can be synthesized using a solution-based reaction of elemental sulfur with 1M $Li(CH_2CH_3)_3BH$ solution in THF. Other suitable techniques of synthesizing nano-$Li_2S$ are known to one of ordinary skill in the art.

The dopants may be introduced into commercial $Li_2S$ or synthesized nano-$Li_2S$ by any number of doping techniques employed in the semiconducting industry, including diffusion and ion implantation, and should not be limited to the methods described herein.

Sometimes the above methods for synthesizing coated nanopowders result in a mixture of completely coated (i.e., pinhole-free) $Li_2S_{1-x-y}Se_xM_y$, and some uncoated and/or partially coated $Li_2S_{1-x-y}Se_xM_y$. The presence of the latter may limit the capacity retention of the Li/S cell over its cycle life, because the imperfectly coated $Li_2S_{1-x-y}Se_xM_y$ could react with the electrolyte or dissolve into the electrolyte. Subsequently, this dissolved sulfide may form a dissolved lithium polysulfide ($Li_2S_x$, $1<x<=8$) that reacts with the negative electrode, resulting in loss of active sulfur and therefore a reduction in the capacity of the cell. Thus, in some examples, the uncoated and/or partially coated $Li_2S_{1-x-y}Se_xM_y$ and the completely coated $Li_2S_{1-x-y}Se_xM_y$ may be separated, and use only the completely coated used in fabricating the positive electrode of the cell.

In one aspect, the presence of a coating enables the doping of $Li_2S$ ex situ, prior to cell fabrication. Without wishing to be bound by theory, the coating suitably maintains the structure of the doped material thereby avoiding the need to re-dope the material every time the cell is cycled. Moreover, the coating prevents reaction of $Li_2S$, S, and lithium polysulfides ($Li_2S_x$, $1<x<=8$) with the electrolyte. The coating also may prevent dissolution of $Li_2S$, S, and lithium polysulfides ($Li_2S_x$, $1<x<=8$) into the electrolyte.

In examples, the positive electrode is a mixture of the active material described herein, and one or more of: a binder (e.g. PVDF) and additional carbon additives to improve conductivity of the matrix, and with pores that are filled with electrolyte (e.g., $LiPF_6$ in blend of carbonates or DOL/DME blend with $LiPF_6$ or LiTFSI salt). In examples, the composite cathode may be in contact with a current collector such as an Al foil.

Suitably, the positive electrode is at least about 30 microns in thickness.

In examples, the active material (e.g., coated $Li_2S_{1-x-y}Se_xM_y$) is present in at least about 40 volume % of the cathode, suitably at least about 50 volume %. The loading of the sulfide material should be sufficient to achieve at least about 1 mAh/cm$^2$, suitably at least about 3 mAh/cm$^2$. Suitably, the active material is present in an amount sufficient to provide at least about 2 mAh of reversible capacity per cm$^2$ of composite electrode.

Thus, the cathode material described herein suitably allows for doping of $Li_2S$ prior to its introduction into the battery cell. Without wishing to be bound by theory, the coating may prevent polysulfide dissolution, thereby maintaining the structure of the doped material as it is delithiated during cell charging and lithiated during cell discharging.

In an example, compared to active electrode materials without dopants, the ones described herein may have enhanced electronic conductivity, and therefore high rate capability may be enabled with larger particles of the material. Larger particles may achieve higher packing densities and require less inactive material additive (including less coating on a wt % basis); hence, it is desirable to use large particles in order to achieve higher energy densities.

The positive electrode is suitably made using a standard method for fabricating battery electrodes, that is, mixing the solid particles with conductive additives, binder, and optionally solid electrolyte powders (e.g., lithium-conducting garnet or lithium-conducting sulfide glasses or ceramics) in a carrier solvent (e.g., NMP). The mixture forms a slurry that can be coated onto the positive current collector. The electrode is then heated so that the solvent evaporates. The electrode may then be densified using a roll press. Optionally, some pores are left in the electrode such that they can be filled with liquid electrolyte during cell fabrication.

In one example, the dissolved lithium polysulfide may be electrochemically oxidized to form sulfur, which in turn can be recycled and used again in the $Li_2S$ purification process. A byproduct of this second process could be the plating of Li metal.

In one aspect, the coated and doped lithium sulfide material according to the present disclosure may also be incorporated into a solid-state cathode using a ceramic and or polymer electrolyte and optionally some electronically conductive additive and/or binder material.

Additionally, graphene oxide can be mixed with the doped $Li_2S$ material prior to coating in order to further enhance electronic conductivity and connectivity of active material grains.

The present disclosure also provides a solid state battery cell wherein the electrolyte, in the cathode and separator and optionally the protection layers, is a solid electrolyte, such as a polymer electrolyte or a ceramic electrolyte, e.g., LLZO, LATP, LATSP, lithium sulfide, or any combination of ceramic or polymer electrolyte materials.

The cathode and lithium-sulfur cell of the present disclosure may be used in any way other cathodes and lithium-sulfur cells are used.

Various features and advantages of the disclosure are set forth in the following claims.

What is claimed is:

1. A particle comprising $Li_2S_{1-x-y}Se_xM_y$, wherein M is a Group VIA element, $x<0.1$, $y<0.05$, at least one of Se or M is present, and M is not S.

2. The particle of claim 1, further comprising a coating around the particle.

3. The particle of claim 1, wherein M is Te or Po.

4. The particle of claim 1, wherein the coating is a mixed electronic and Li$^+$ conductor.

5. The particle of claim 4, wherein the coating is carbon or $Ti_2S$.

6. The particle of claim 1, wherein the coating is an insulator.

7. The particle of claim 6, wherein the coating is $Al_2O_3$.

8. A lithium-sulfur cell comprising:
   (a) a negative electrode;
   (b) a separator; and
   (c) a positive electrode comprising the particle of claim 1.

9. The lithium-sulfur cell of claim 8, wherein the particle is present in an amount of at least about 40 volume % of the positive electrode.

10. The lithium-sulfur cell of claim 8, wherein the positive electrode is more than about 30 microns thick.

* * * * *